United States Patent [19]

Bateham

[11] Patent Number: 4,615,555
[45] Date of Patent: Oct. 7, 1986

[54] PICK UP TOOL AND JAW APPARATUS THEREFOR

[76] Inventor: Joseph E. Bateham, Rte. 1, Box 159A3, Sylvester, Ga. 31791

[21] Appl. No.: 730,337

[22] Filed: May 3, 1985

[51] Int. Cl.⁴ .............................................. B25J 1/00
[52] U.S. Cl. ................................... 294/19.1; 294/104
[58] Field of Search .................. 294/19.1, 8.5, 11, 22, 294/23, 50.8, 50.9, 104, 115

[56] References Cited

U.S. PATENT DOCUMENTS

| | | | |
|---|---|---|---|
| 2,507,655 | 5/1950 | Welshans et al. | 294/19.1 |
| 2,575,638 | 11/1951 | Price | 294/19.1 |
| 3,591,226 | 7/1971 | Elmore, Jr. et al. | 294/19.1 |
| 4,037,868 | 7/1977 | Baker | 294/19.1 |

Primary Examiner—James B. Marbert
Attorney, Agent, or Firm—James B. Middleton

[57] ABSTRACT

A pick up device having a shank with a handle on one end and a jaw assembly on the other. The jaw assembly includes a fixed jaw and a movable jaw, the movable jaw having a pair of jaw operating arms that can be moved to open and close the jaw member. A spring is connected to one jaw operating arm and a link is connected to the other jaw operating arm, and the two are interchangeable so the jaw can be normally open or normally closed. The link is operated from the handle. In one form of the invention, the shank can telescope, and the operating is through a cable that can be extended.

12 Claims, 9 Drawing Figures

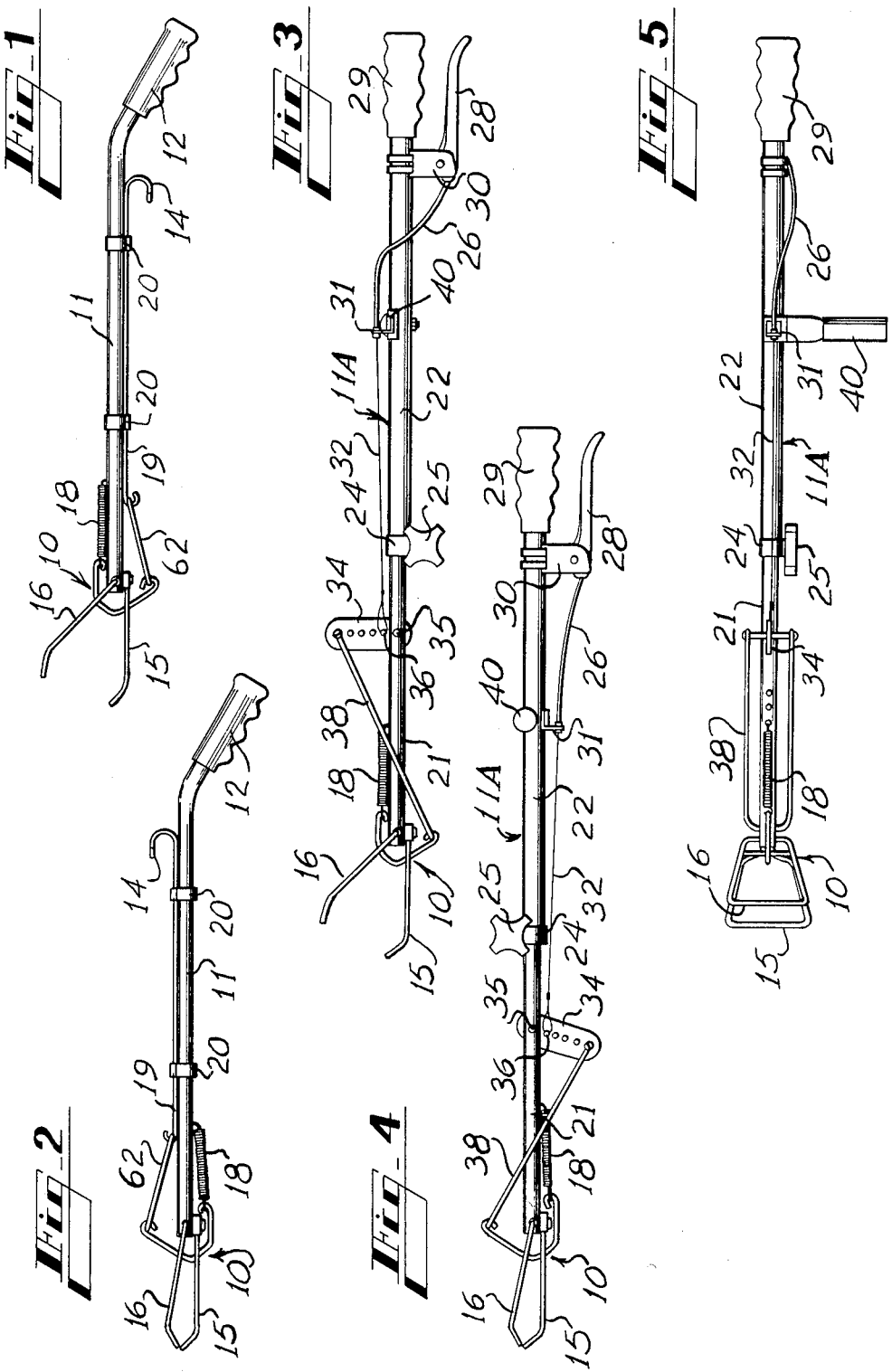

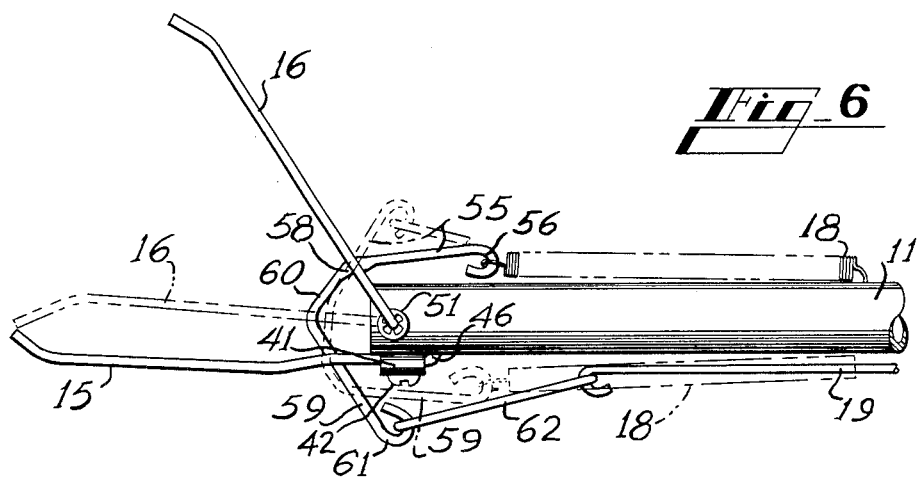
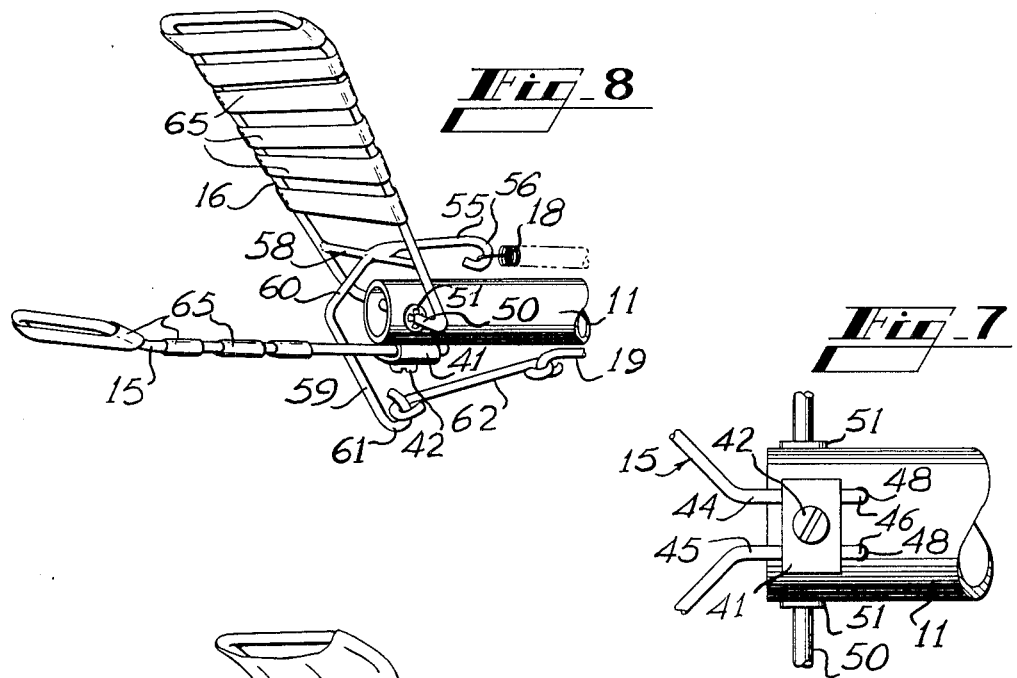
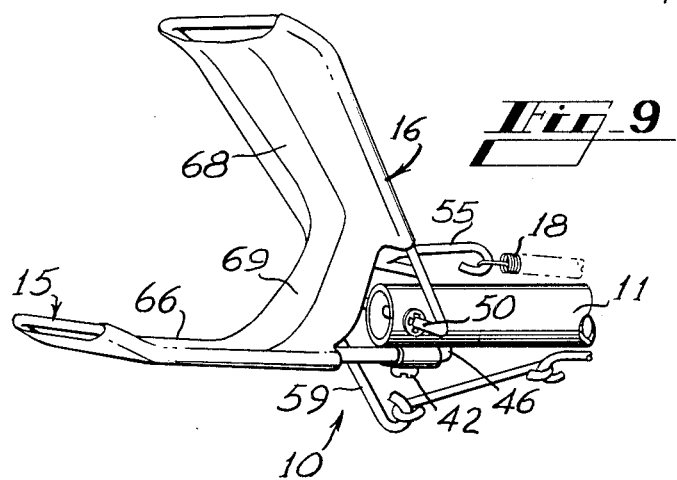

PICK UP TOOL AND JAW APPARATUS THEREFOR

INFORMATION DISCLOSURE STATEMENT

It has frequently been recognized that there is a need for means to grasp objects that are beyond reach of the unaided hand. This need has been recognized in the physically handicapped who are unable to bend or stoop as well as in the normal person who is simply seeking greater convenience or efficiency. Thus, prior art pick up devices have been designed for retrieving golf balls, picking up nuts, picking fruit from trees and many other specialized functions. There have also been provided a great variety of general function pick up devices including generally a stationary jaw and a movable jaw, with some means to urge the movable jaw towards the stationery jaw to grasp an object.

The U.S. patent to Baker, U.S. Pat. No. 4,037,868, discloses a telescoping rod having a fixed jaw at one end thereof, and a movable jaw pivoted to the stationary jaw, the pivoted jaw being moved by means of a rod that is appropriately extendable in length. The patent to Whitney, U.S. Pat. No. 4,160,563 discloses a pick up tool having a stationary jaw and a movable jaw, the movable jaw being urged into engagement with the stationary jaw through a Bowden wire, by means of a conventional handle.

The prior art pick up tools have normally been relatively limited in their scope. The operating means for the pick up tool is normally of a relatively fixed nature, and the gripping jaws are also generally of a relatively fixed nature. Thus, a pick up tool designed to pick up a particular item, or type of item, is usually unadaptable to serve a different function. Any modifications in the prior art devices will generally require considerable redesigning and the like since the operating mechanisms are not flexible in their function.

SUMMARY OF THE INVENTION

This invention relates generally to pick up tools, and is more particularly concerned with a jaw means for a pick up tool, and a versatile operating system for use with the jaw means.

The present invention provides a jaw assembly for a pick up tool, the jaw assembly including a stationary jaw member and a movable jaw member. The movable jaw member includes a first operating means for urging the movable jaw member in one direction, and a second jaw operating means for urging the jaw in the opposite direction. Any desired force applying arrangement can be utilized to urge the jaw in either direction, so the jaw can be in a normally open position and selectively closable, or in a normally closed position and selectively openable.

For urging the movable jaw member in the selected direction, it is contemplated that a spring means will be utilized on one of the jaw operating means, and a controllable rod means will be utilized on the other operating member.

The invention further contemplates a simple pick up tool having an operating rod rather directly connected to one of the movable jaw operating means, as well as a more elaborate, telescoping pick up tool wherein a Bowden wire operates a lever assembly having a linkage for operation of the movable jaw member. The jaw members are easily variable for gripping various types of objects so the complete pick up tool is extremely variable in function.

BRIEF DESCRIPTION OF THE DRAWINGS

These and other features and advantages of the present invention will become apparent from consideration of the following specification when taken in conjunction with the accompanying drawings in which:

FIG. 1 is a side elevational view of a pick up tool made in accordance with the present invention, the movable jaw being in a normally open condition;

FIG. 2 is a view similar to 1, but showing the movable jaw in a normally closed condition;

FIG. 3 is a side elevational view of a telescoping pick up tool made in accordance with the present invention, the movable jaw being shown in the normally open condition;

FIG. 4 is a view similar to FIG. 3 but showing the movable jaw in a normally closed condition;

FIG. 5 is a top plan view of the apparatus shown in FIG. 3;

FIG. 6 is an enlarged side elevational view showing the pick up jaws made in accordance with the present invention, the normally open condition being shown in full lines and the normally closed condition being shown in broken lines;

FIG. 7 is a fragmentary view showing the fixing of the stationary jaw to the tool; and, FIGS. 8 and 9 are perspective views showing two different coverings for the jaws of the pick up tool of the present invention.

DETAILED DESCRIPTION OF THE EMBODIMENTS

Referring now more particularly to the drawings, and to those embodiments of the invention here presented by way of illustration, the pick up tool shown in FIG. 1 of the drawings includes the pick up jaw assembly generally designated at 10, the jaw assembly 10 being mounted at one end of a shank 11. The opposite end of the shank 11 is provided with a handle 12 having an appropriate rubber grip or the like. Adjacent to the handle 12, there is a trigger 14 that is shown on the lower side of the shank 11, the trigger 14 being so placed as to be within reasonable reach of the forefinger of the hand holding the handle 12.

The pick up jaw assembly 10 includes a stationary jaw 15 and a movable jaw 16. In FIG. 1, the movable jaw 16 is in a normally open position, pivoted away from the stationary jaw 15. The jaw 16 is held in this position by a spring 18, and the movable jaw 16 is closable by means of the linkage 19 connected to the trigger 14. It will be seen that the linkage 19 is held adjacent to the shank 11 by bands 20.

Looking now at FIG. 2 of the drawings, it will be seen that all apparatus in FIG. 2 is precisely the same as that shown in FIG. 1; therefore, all parts carry the same reference numerals. It will be noticed in FIG. 2, however, that the spring 18 has been moved from above the shank 11 to below the shank 11, while the operating linkage 19 has been moved from below the shank 11 to above the shank 11. Thus, the trigger 14 is also above the shank 11. It will be seen that the spring 18 now retains the movable jaw 16 in a normally closed position, while the linkage 19 can be operated by the trigger 14 to open the pick up jaw assembly 10.

With this general understanding, attention is directed to FIGS. 3–5 of the drawings. Again, the pick up jaw assembly is the same, and is designated generally at 10. The jaw members are also designated at 15 and 16 since the construction is the same as that previously described.

The primary difference in the device shown FIGS. 3, 4 and 5 is that this device is extensible through a telescoping shank 11A. It will be seen that the shank portion 21 carrying the jaw assembly 10 is telescopingly receivable in a shank portion 22. A clamp 24 can be tightened by means of the knob 25 to fix the shank portion 21 with respect to the shank portion 22 once the length has been determined.

In this embodiment of the invention, the operating arrangement for the jaws 10 is through a Bowden wire 26 operated by means of a conventional pivoted hand-lever 28 adjacent to the handle 29. The Bowden wire 26 extends from the mounting flange 30 to a bracket 31. After the bracket 31, the bare cable 32 extends along the shank portion 22 and the shank portion 21 to be attached to the lever 34. The cable 32 can be bent back on itself and appropriately clamped for convenient change of length when the length of the shank 11A is changed.

It will be understood by those skilled in the art that the lever such as the hand lever 28 and the Bowden wire 26 are normally arranged for a rather small linear motion. As will be better understood hereinafter, the jaw assembly 10 requires a somewhat larger motion for operation of the jaw; therefore, the lever arrangement 34 is used to amplify the linear motion of the cable 32. The lever 34 is pivoted to the shank portion 21 as at 35, and the cable 32 is attached to a pin 36. At the extending end of the lever 34, there is a link in the form of a bail 38 which connects to the lever 34 and to an operating member of the movable jaw 16. With this arrangement, it will be seen that the cable 32 is connected very closely to the pivot 35 while the bail 38 is connected a relatively long distance from the pivot 35. As a result, a small motion of the cable 32 will cause a large motion of the bail 38.

It is contemplated that the pick up tool shown in FIGS. 3, 4 and 5 will be relatively long, and the device may be somewhat unhandy for operation with only one hand. To resolve this difficulty, there is a second handle designated at 40, the handle 40 being fixed to the shank portion 22 somewhat forwardly of the handle 29, the handle 40 extending transversely to the shank portion 22. Thus, one can hold the tool scythe-like for easy manipulation of the device.

Since the device as shown in FIGS. 3 and 4 have the same parts, some of the parts simply being rotated between the two figures, those skilled in the art will understand both figures from the foregoing description. It will be seen that the bracket 31 has been moved from the top to the bottom of the shank 11A, the clamp 24 has been rotated simply to avoid entanglement with the cable 32, and the lever 34 has been moved from the top to the bottom. The bail 38 is connected to one movable jaw operating member in Fig. 3, and to the opposite operating member in FIG. 4, and the spring 18 is likewise relocated.

For a better understanding of the jaw assembly 10, attention is directed to FIG. 6 of the drawings. Here it will be seen that the stationary jaw 15 is fixed to the shank, such as the shank 11, by means of a clamp 41 held by a screw 42.

In FIG. 7 of the drawings, it will be seen that the stationary jaw 15 is shown fragmentarily, and it will be seen that the jaw 15 terminates in parallel members 44 and 45. These parallel members extend along the shank 11, and terminate in inwardly bent portions 46, the inwardly bent portions 46 extending through holes 48 in the shank 11.

It will now be understood that the stationary jaw 15 may be formed of wire, or round rod or the like, and the connecting arrangement utilizing the clamp 41 provides a very simple connection, but yields a secure connection that lends stability to the stationary jaw 15. Twisting, or warping, of the stationary jaw 15 will necessarily cause axial rotation of the inwardly bent portions 46. Since these portions are held within the holes 48, the jaw 15 is held against such warping.

With attention to FIGS. 6 and 7, it will be seen that the movable jaw 16 may also be formed of wire, small rod or the like, and includes a transversely directed axle portion 50 which passes through appropriate holes in the shank 11. Obviously, various forms of bearings and the like may be utilized if desired in the event high precision is desired. In general, either a simple hole through the shank 11, or nylon bearings or the like will serve quite well. To hold the axle portion 50 in place, limiting washers 51 are used on each side of the shank 11. Those skilled in the art will recognize that washers such as the washers 51 are readily available, and are designed to slide in one direction along a member, but to bite into the member when force is applied in the opposite direction. While these devices are readily available and work quite well, the use of bearings or other apparatus would be a reasonable substitute therefor.

In FIG. 6, the movable jaw 16 is shown in its maximum open position. The first operating member for the movable jaw 16 is designated at 55, and includes the rod member extending generally along the shank 11 and terminating in a hook 56. The operating member 55 is fixed to the jaw member 16 by being welded or otherwise fixed to a cross-member 58.

As here shown, the first operating member 55 and second operating member 59 are integrally formed with a bridge 60 therebetween. The bridge 60 is formed integrally with the first operating member 55 and is therefore also fixed to the cross-member 58.

With attention to the broken line representation in FIG. 6, it will be seen that the two operating members 55 and 59 with the connecting bridge 60 constitutes a nearly symmetrical operating arrangement. In one extreme position, the operating member 55 lies along the shank 11 with the hook 56 substantially engaging the shank 11. When the movable jaw 16 is moved to its closed position, the operating member 59 extends generally along the shank 11 with the hook 61 substantially engaging the shank 11. It will therefore be understood that the bridge 60 is required because of the location of the pivot 50 with respect to the operating members 55 and 59.

In full lines in FIG. 6, it will be seen that the arrangement is substantially that shown in FIG. 1 of the drawings wherein the spring 18 urges the operating member 55 towards the handle 12, causing the movable jaw 16 to pivot to its open position. The link member 62 constitutes the forward portion of the linkage 19; and, the trigger 14 could be pulled to operate the linkage 19 and pull the link 62 to cause rotation of the jaw 16 about the axle 50 to close the jaw.

Looking at the broken line representation in FIG. 6, it will be seen that the arrangement is substantially that shown in FIG. 2 of the drawings. Here the spring 18 is connected to the operating member 59 to urge the movable jaw 16 to its normally closed position. The link 62 would then connect to the linkage 19 for operation by the trigger 14 to open the movable jaw 16.

As discussed above, it is contemplated that the jaws 15 and 16 are formed of wire or small rod or the like, and the jaws may define an open plane that would be suitable for grasping numerous objects that can be gripped by the wire members. In the event one wishes to pick up more difficult objects, such as round balls, fruit or the like, some filling may be required for the open plane of the jaw members. In FIG. 8, it will be seen that the jaw members as discussed hereinabove are provided with a series of bands 65. The bands 65 may be conventional rubber bands that can be stretched and slipped over the opposing wire forming the jaws 15 and 16. Spacing can be as desired depending on the items to be picked up. Thus, if one wishes only to pick up pine cones, apples or pears or the like, a relatively few rubber bands 65 may be placed along the jaw members 15 and 16 just sufficiently to hold the objects to be picked up. On the other hand, if smaller items such as golf balls, rocks or the like are to be picked up, rubber bands 65 may be placed closer together to retain the desired objects.

Looking at FIG. 9 of the drawings, the arrangement here presented shows a completely filled-in plane of the jaw member. As shown in FIG. 9, it is contemplated that jaw covers indicated at 66 and 68 will be provided with pockets for receiving the jaws 15 and 16 so the jaws have completely solid surfaces. Furthermore, an apron 69 may extend between the covers 66 and 68 so an object may be completely cradled within the jaw 10.

The covers 66 and 68 may of course be made of conventional rubber, thermoplastic elastomers or the like, or the covers 66 and 68 may be made of conventional fabrics or the like.

The embodiment of the invention shown in FIG. 9 would be admirably suited for picking fruit from a tree where a movement of the fruit would be restricted by the apron 69 while being supported by the covers 66 and 68, and held in place by the jaw 10.

From the foregoing, it will now be readily understood that the present invention provides a jaw structure for a pick up device, the jaw structure being highly versatile in general configuration, and variable as to a normally open or a normally closed condition. The operating system with which the jaw structure is used can be quite simple because of the design of the jaw structure, even in a telescoping shank. The jaw can very easily be made of steel or aluminum wire or the like, or could of course be made of plastics when strength requirements would allow.

It will therefore be understood by those skilled in the art that the particular embodiments of the invention here presented are by way of illustration only, and are meant to be in no way restrictive; therefore, numerous changes and modifications may be made, and the full use of equivalents restored to, without departing from the spirit or the scope of the invention as defined in the appended claims.

I claim:

1. In a pick up device of the type comprising a shank, a jaw assembly carried at one end of said shank, a handle at the opposite end of said shank, and operating means for selectively opening and closing said jaw assembly, the improvement wherein said jaw assembly includes a stationary jaw member fixed to said shank and extending beyond said one end of said shank, said stationary jaw comprising a wire frame defining an open plane, a movable jaw member pivotally carried at said one end of said shank, an axle passing through said one end of said shank generally parallel to said plane of said stationary jaw, said axle carrying said movable jaw, said movable jaw member comprising a wire frame defining an open plane and being pivotal on said axle to move towards and away from said stationary jaw member, a first jaw operating member extending from one side of said movable jaw member opposite from said stationary jaw member and disposed on one side of said shank, a second jaw operating member extending from the opposite side of said movable jaw member, said second jaw operating member passing through said open plane of said stationary jaw member and being disposed on the opposite side of said shank, a first force applying means on said one side of said shank for urging said first jaw operating member in a direction to open said jaw assembly, and a second force applying means on said opposite side of said shank for urging said second jaw operating member in a direction to close said jaw assembly said first force applying means including spring means extending between said first jaw operating means and said shank, said second force applying means including controllable rod means, said operating means being adjacent to said handle for controlling said controllable rod means.

2. In a pick up device as claimed in claim 1, said movable jaw member including a cross-member parallel to said axle, said first jaw operating member being fixed to said cross-member, a bridge fixed to said cross-member and having said second jaw operating member at its extending end.

3. In a pick up device as claimed in claim 2, the further improvement wherein said first force applying means and said second force applying means are interchangeable.

4. In a pick up device as claimed in claim 2, said controllable rod means including a link pivotally connected to said second jaw operating means, a linkage pivotally connected to said link and extending along said shank, said linkage being connected to said operating means.

5. In a pick up device as claimed in claim 2, said controllable rod means including a bail, a lever pivoted to said shank, said bail extending between said second jaw operating means and the extending end of said lever, and cable means for pivotally moving said lever with respect to said shank, the arrangement being such that motion of said lever causes motion of said jaw operating means for opening or closing said jaw assembly.

6. In a pick up device as claimed in claim 5, said cable means including a Bowden wire, said operating means comprising a hand lever adjacent to said handle for operating said Bowden wire for moving said lever.

7. In a pick up device as claimed in claim 6, said shank including a first shank portion and a second shank portion that can be telescoped with respect to each other, and clamp means for selectively fixing said first shank portion with respect to said second shank portion.

8. In a pick up device as claimed in claim 7, the further improvement comprising a second handle fixed to said second shank portion and extending transversely to said shank, said second handle being located close enough to said handle that a person can grasp said handle with one hand and simultaneously grasp said second handle with the other hand.

9. In a pick up device as claimed in claim 2, said jaw assembly further including means for selectively filling said open plane of said stationary jaw member and said movable jaw member, said means for selectively filling said open plane including a plurality of elastic strips extending transversely of said jaw members parallel to said axle.

10. In a pick up device as claimed in claim 2, said jaw assembly further including means for selectively filling said open plane of said stationary jaw member and said movable jaw member, said means for selectively filling said open plane including a first cover for covering said stationary jaw member and a second cover for covering said movable jaw member, and an apron extending between said first cover and said second cover.

11. In a pick up as claimed in claim 1, the further improvement wherein said wire frame of said stationary jaw includes a pair of parallel members extending along said shank, each member of said pair of members including an inwardly bent portion, said shank defining holes therein receiving said inwardly bent portions, and clamp means for holding said pair of parallel members against said shank, the arrangement being such that said holes in said shank prevent motion of said inwardly bent portions to stabilize said stationary jaw.

12. In a pick up as claimed in claim 11, the improvement wherein said clamp means comprises a clamp member engaging both said parallel members, and a screw passing through said clamp member and into said shank for holding said clamp member to said shank with said pair of parallel members therebetween.

* * * * *